United States Patent
Kim

(10) Patent No.: US 10,913,408 B2
(45) Date of Patent: Feb. 9, 2021

(54) SYSTEM FOR DETERMINING STATE OF POWER RELAY ASSEMBLY

(71) Applicants: Hyundai Motor Company, Seoul (KR); Kia Motors Corporation, Seoul (KR)

(72) Inventor: Do Kon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 27 days.

(21) Appl. No.: 16/399,113

(22) Filed: Apr. 30, 2019

(65) Prior Publication Data

US 2020/0122655 A1 Apr. 23, 2020

(30) Foreign Application Priority Data

Oct. 23, 2018 (KR) .................. 10-2018-0126843

(51) Int. Cl.
| | |
|---|---|
| *H02M 1/00* | (2006.01) |
| *H02M 7/06* | (2006.01) |
| *H02M 7/12* | (2006.01) |
| *H02M 7/217* | (2006.01) |
| *B60R 16/023* | (2006.01) |
| *B60R 16/033* | (2006.01) |
| *B60L 53/62* | (2019.01) |
| *B60L 58/12* | (2019.01) |

(52) U.S. Cl.
CPC .......... *B60R 16/0232* (2013.01); *B60L 53/62* (2019.02); *B60L 58/12* (2019.02); *B60R 16/033* (2013.01)

(58) Field of Classification Search
CPC ... B60R 16/0232; B60R 16/033; B60L 53/62; B60L 58/12; B60L 3/0046
See application file for complete search history.

(56) References Cited

U.S. PATENT DOCUMENTS

| | | | |
|---|---|---|---|
| 8,264,201 B2 * | 9/2012 | Tae ...................... | H02J 7/0026 320/118 |
| 9,748,768 B2 * | 8/2017 | Smith ...................... | H02J 1/12 |
| 9,787,084 B2 * | 10/2017 | Yoshida ................ | H02M 7/062 |
| 10,516,344 B2 * | 12/2019 | Yoshida ................ | H02M 7/125 |

FOREIGN PATENT DOCUMENTS

| | | |
|---|---|---|
| KR | 20130092350 A | 8/2013 |
| KR | 20160012395 A | 2/2016 |

\* cited by examiner

*Primary Examiner* — Kenneth B Wells
(74) *Attorney, Agent, or Firm* — Mintz Levin Cohn Ferris Glovsky and Popeo, P.C.; Peter F. Corless

(57) ABSTRACT

A system for determining a state of a power relay assembly includes: a power relay assembly for determining electrical connection states of first and second input-output ports; a relay controller outputting a control signal; a battery management system for determining a connection state of the relay and directing a connection state adjustment of the relay; and a voltage sensor for sensing a voltage of the first input-output port and outputting a state signal. By determining the state of the power relay assembly, it is possible to take quick action against trouble by subdividing and distinguishing a type of abnormality of the power relay assembly, and to prevent a larger problem from occurring by diagnosing relay abnormality in advance and quickly taking a fail safe operation.

10 Claims, 4 Drawing Sheets

SYSTEM FOR DETERMINING STATE OF POWER RELAY ASSEMBLY

CROSS REFERENCE TO RELATED APPLICATION

The present application claims under 35 U.S.C. § 119(a) the benefit of Korean Patent Application No. 10-2018-0126843, filed Oct. 23, 2018, the entire contents of which are incorporated by reference herein.

BACKGROUND

(a) Technical Field

The present disclosure generally relates to a system for determining a state of a power relay assembly, and more particularly, to a system that can determine the state of the power relay assembly, which is a typical source of an abnormality that occurs in an electrical power system of an eco-friendly vehicle.

(b) Description of the Related Art

Recently, environmental regulations such as carbon dioxide emission restrictions have led to the development of eco-friendly vehicles that can replace existing internal combustion engine vehicles. Eco-friendly vehicles can be classified as pure electric vehicles moving only by electric motors capable of converting electric energy into kinetic energy to produce driving force of the vehicles, hybrid vehicles that use internal combustion engines and electric motors as driving sources, or plug-in hybrid vehicles. These types of eco-friendly vehicles are already commercially available or are being commercialized depending on manufacturers.

An eco-friendly vehicle typically is equipped with a high-voltage battery as an energy storage device for supplying electric power to an electric motor performing as a driving source, and has a power relay assembly (PRA) arranged between the high-voltage battery and a driving system of the electric motor to form/interrupt electrical connection between the two according to whether the vehicle is started or not.

The power relay assembly may include a plurality of high-voltage relays, and if necessary, may further include a semiconductor switching element such as insulated gate bipolar transistor (IGBT) connected in parallel to the high-voltage relays, in order to reduce arc generated during operation of the high-voltage relays.

In controlling the plurality of the relays included in the power relay assembly, when a fault occurs in a switch or a peripheral circuit, an abnormality may occur in a power supply. In particular, the relays may be damaged by high temperature due to overcurrent, so that problems may occur in supplying electric power to the electric motor, which is the power source of the eco-friendly vehicle.

Accordingly, a technique for quickly determining whether or not an abnormality has occurred in the power relay assembly of the electrical power system for driving the eco-friendly vehicle is required for safe driving of the eco-friendly vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a system for determining a state of a power relay assembly, which can determine the state of the power relay assembly that is one of the causes of occurrence of an abnormality that occurs in an electrical power system of an eco-friendly vehicle.

In order to achieve the above object, according to one aspect of the present disclosure, there is provided a system for determining the state of the power relay assembly including: a power relay assembly including at least one relay for determining electrical connection states of a first input-output port connected to a side of a battery of a vehicle and a second input-output port, and an electrical connection state between the first input-output port and the second input-output port; a relay controller outputting a control signal controlling the electrical connection states to the relay; a battery management system for determining a connection state of the relay and directing a connection state adjustment of the relay; and a voltage sensor for sensing a voltage of the first input-output port and outputting a state signal indicating a state of the power relay assembly, based on the sensing voltage of the first input-output port and the control signal output from the relay controller.

In an embodiment of the present disclosure, when an abnormal signal is input from an upper controller, the battery management system may read an electrical connection state between the battery and the power relay assembly and an operation state of the relay, based on the state signal output by the voltage sensor, and determine whether the signal is abnormal or not.

In the embodiment of the present disclosure, when a voltage smaller than a pre-set size is sensed, the voltage sensor may output a first output value as the state signal, when a voltage larger than the pre-set size is sensed and when the control signal is a signal for opening the relay, the voltage sensor may output a second output value as the state signal, and when a voltage larger than the pre-set size is sensed and when the control signal is a signal for closing the relay, the voltage sensor outputs a third output value as the state signal.

In the embodiment of the present disclosure, when the voltage sensor outputs the first output value, the battery management system may determine that the battery and the power relay assembly are disconnected.

In the embodiment of the present disclosure, when the voltage sensor outputs the second output value during driving the vehicle, the battery management system may determine that the battery and the power relay assembly are in a short-circuited state and the relay is opened.

In the embodiment of the present disclosure, when the voltage sensor outputs the third output value during driving the vehicle, the battery management system may determine that the battery and the power relay assembly are in the short-circuited state and the relay is operated normally.

The embodiment of the present disclosure may further include a charge controller for determining whether charging power for charging the battery is provided from a charge facility outside the vehicle or not, in addition, the power relay assembly may further include a semiconductor switching element for arc suppression which is connected to the relay in parallel.

In the embodiment of the present disclosure, when the charge controller determines that the charging power is provided, the battery management system may direct the semiconductor switching element to turn off.

In the embodiment of the present disclosure, when the charge controller determines that the charging power is provided and when the voltage sensor outputs the second output value, the battery management system may determine that the battery and the power relay assembly are in the short-circuited state and the relay is opened.

In the embodiment of the present disclosure, when the charge controller determines that the charging power is provided and when the voltage sensor outputs the third output value, the battery management system may determine that the battery and the power relay assembly are in short-circuited state and the relay is operated normally.

According to the system for determining the state of the power relay assembly, it is possible to take quick action against trouble by subdividing and distinguishing a type of abnormality of the power relay assembly. In addition, by quickly taking a fail safe operation, it is possible to prevent a larger problem from occurring by diagnosing relay abnormality in advance.

In addition, when a high voltage relay assembly, to which the semiconductor switching element is applied, is applied to the system for determining the state of the power relay assembly, the system for determining the state of the power relay assembly can prevent the semiconductor switching element from being damaged by a momentary reverse voltage when the eco-friendly vehicle is charged.

Effects obtained by the present disclosure are not limited to the effects mentioned above, and other effects not mentioned can be clearly understood through the following description by those skilled in the art to which the present disclosure belongs.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a system for determining a state of a power relay assembly according to exemplary embodiments of the present disclosure will be described in detail with reference to the accompanying drawings.

Figure 1:
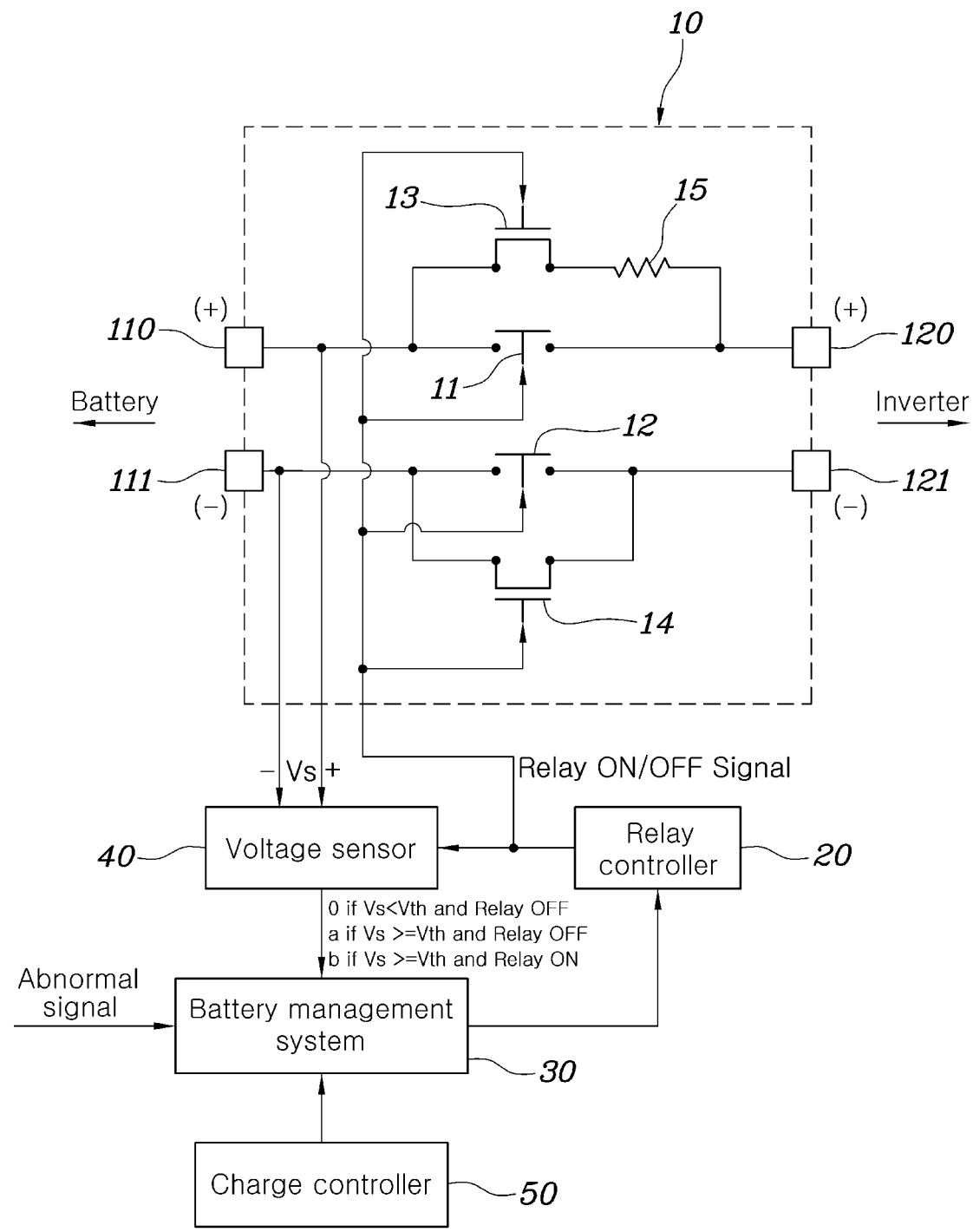
FIG. 1 is a block diagram showing a structure of a system for determining a state of a power relay assembly according to an embodiment of the present disclosure.

FIG. 1 is a block diagram showing a structure of a system for determining a state of a power relay assembly according to an embodiment of the present disclosure.

Referring to FIG. 1, according to the embodiment of the present disclosure, the system for determining the state of the power relay assembly may include the power relay assembly 10, a relay controller 20, a battery management system (BMS) 30, and a voltage sensor 40.

The power relay assembly 10 may include at least one of relays 11 and 12, which determine electrical connection states of first input-output ports 110 and 111 connected to a side of a battery and of second input-output ports 120 and 121, and an electrical connection state between the first and the second input-output ports 110, 111, 120, and 121.

The relays included in the power relay assembly 10 may include a first main relay 11, which is disposed between an output port 110 that is a positive electrode of the first input-output ports and an output port 120 that is the positive electrode of the second input-output ports and determines electrical connection between both positive electrodes, and include a second main relay 12, which is disposed between an output port 111 that is a negative electrode of the first input-output ports and an output port 121 that is the negative electrode of the second input-output ports and determines electrical connection between both negative electrodes.

In addition, the power relay assembly 10 may further include a semiconductor switching element (for pre-charge) 13 having a first end connected to a first end of the first main relay, a pre-charge resistor 15 having opposite ends which are respectively connected to a second end of the semiconductor switching element 13 and a second end of the first main relay 11, and a semiconductor switching element (for arc suppression) 14 having both ends which are respectively connected to both ends of the second main relay 12 and connected to the second main relay 12 in parallel.

When an eco-friendly vehicle including the power relay assembly 10 is turned on (ignition-on state), the semiconductor switching element (for pre-charge) 13, which is in an off state, is turned on first, and current of the battery, which is provided through the first input-output ports 110 and 111, is provided to the second input-output ports 120 and 121 through the pre-charge resistor 15, and then a capacitor of an inverter connected to the second input-output ports 110 and 111 is charged. The semiconductor switching element (for pre-charge) 13 and the pre-charge resistor 15 may be provided to prevent the capacitor from being damaged by suddenly providing the current of the battery to the capacitor of the inverter.

When the capacitor of the inverter is charged, the first main relay 11 and the second main relay 12 are switched from off states to on states, and therefore, it is possible to provide battery power that is provided to the first input-output ports 110 and 111 to the inverter connected to the second input-output ports 120 and 121.

When the vehicle is turned off (ignition-off state), the semiconductor switching element (for arc suppression) 14 is switched from an off state to an on state, the first main relay 11 and the second main relay 12 are turned off, and the semiconductor switching element (for arc suppression) 14 is turned off, so an electrical connection between the battery and the inverter is cut off after the first main relay 11 and the second main relay 12 are turned off. Before the relays 11 and 12 that perform mechanical operations are turned off, the semiconductor switching element (for arc suppression) 14 is turned on, and maintains the electrical connection between the first input-output ports 110 and 111 and the second input-output ports 120 and 121, thereby reducing arc that may occur during the process of turning off the relays 11 and 12.

In the case of the power relay assembly 10 as shown in FIG. 1, the semiconductor switching element (for pre-charge) 13 may be replaced by a relay, and the semiconductor switching element (for arc suppression) 14 may be omitted. In addition, the semiconductor switching element (for pre-charge) 13 and the semiconductor switching element (for arc suppression) 14 are realized as an insulated gate bipolar transistor (IGBT) or a power field effect transistor (PET).

The relay controller 20 may provide a control signal, for controlling electrical connection states of the relays 11 and 12 and the semiconductor switching elements 13 and 14 in the power relay assembly 10 to the relays 11 and 12 and the semiconductor switching elements 13 and 14. In addition, the control signal of the relay controller 20 may be input to the voltage sensor 40 that will be described hereinafter.

The battery management system 30 is a controller provided in the eco-friendly vehicle configured to maintain optimal operation of the battery by sensing on or more physical characteristic such as voltage, current, and temperature of the battery, by calculating a current state (state of charge, SoC), and by controlling peripheral devices related to the battery.

In various embodiments of the present disclosure, the battery management system 30 determines the electrical connection states of the relays 11 and 12 and the semiconductor switching elements 13 and 14 of the power relay assembly 10, and provides directions regarding determined connection states to the relay controller 20. That is, the relay controller 20 receives the directions regarding the electrical connection states determined by the battery management system 30, and provides a control signal to the relays 11 and 12 and the semiconductor switching elements 13 and 14, thereby controlling the electrical connection states of the relays 11 and 12 and the semiconductor switching elements 13 and 14 in accordance with the directions of the battery management system 30.

In addition, the battery management system 30 may determine the state of the power relay assembly 10 based on a state signal provided by the voltage sensor 40, to be described below.

The voltage sensor 40 may sense voltage of the first input-output ports 110 and 111, and output the state signal indicating the state of the power relay assembly, based on sensing voltage of the first input-output ports 110 and 111 and the control signal output by the relay controller.

In the embodiment of the present disclosure, the voltage sensor 40 preferably is utilized as a sensor capable of outputting information regarding the state of the power relay assembly 10, based on whether the voltage of the first input-output ports 110 and 111 connected to the battery is sensed or not and based on the control signal provided from the relay controller 20.

Figure 2:
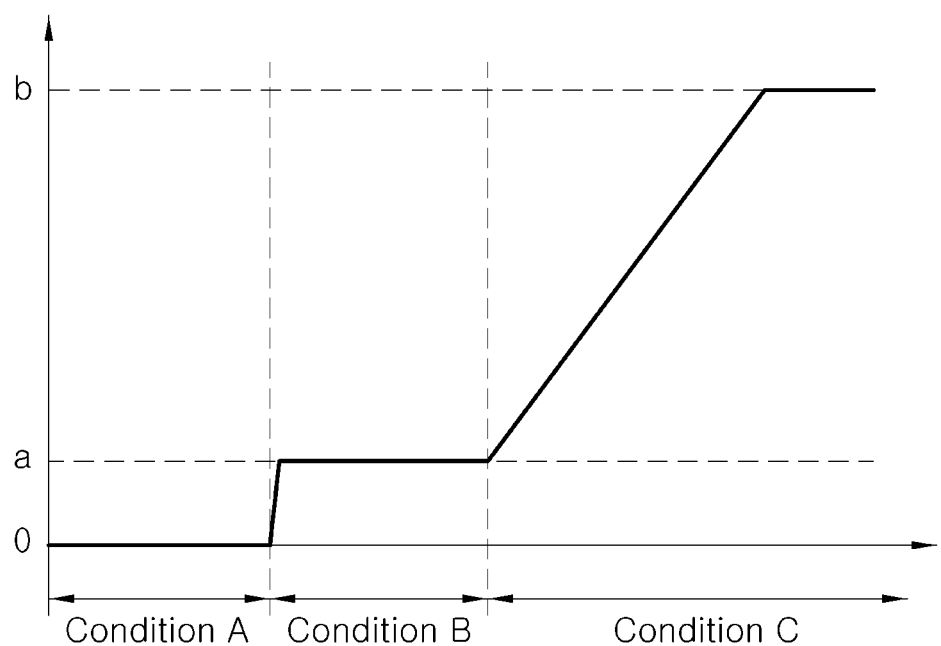
FIG. 2 is a graph showing an output example of a voltage sensor of the system for determining the state of the power relay assembly according to the embodiment of the present disclosure.

FIG. 2 is a graph showing an output example of a voltage sensor of the system for determining the state of the power relay assembly according to the embodiment of the present disclosure.

Referring to FIG. 2, when a voltage smaller than a pre-set size is sensed as the sensing voltage that is sensed from the first input-output ports 110 and 111, the voltage sensor 40 may output a first output value as the state signal (condition A). Here, the pre-set size may be a value that determines a disconnected state at which the electrical connection between the battery and the first input-output ports 110 and 111 is cut off, the pre-set size may be a reference value which may be substantially determined as 0 V. That is, when the battery and the power relay assembly 10 are disconnected from each other, the voltage sensor 40 may output the first output value corresponding to substantially 0V as the state signal.

In addition, when a voltage larger than the pre-set size is sensed as the sensing voltage, in which the voltage of the first input-output ports 110 and 111 is sensed, and when the control signal output from the relay controller 20 is a signal for adjusting the relays 11 and 12 to be opened-off, the voltage sensor 40 may output a second output value corresponding to a V (a value is not 0) as the state signal (condition B). Here, the pre-set size may be a reference size at which voltage of the battery can be determined to be normal. That is, when a voltage larger than the pre-set size is sensed as the sensing voltage of the first input-output ports 110 and 111, the battery and the first input-output ports 110 and 111 are determined to be electrically short-circuited.

In addition, when a voltage larger than the pre-set size is sensed as the sensing voltage of the first input-output ports 110 and 111, and when the control signal output from the relay controller 20 is a signal for adjusting the relays 11 and 12 to be short-circuited on, the voltage sensor 40 may output a third output value corresponding to b V (a value is not 0 and a) as the state signal (condition C).

As described above, when the battery management system 30 receives an abnormal signal, which notifies that an abnormality occurs in an electrical power system for driving an electric motor of the eco-friendly vehicle, from an upper controller such as a vehicle control unit (VCU) or a hybrid control unit (HCU), the battery management system 30 may confirm the state signal output from the voltage sensor 40 and determine the state of the power relay assembly 10.

In addition, depending on a result of determining the state of the power relay assembly 10, the battery management system 30 can alert a driver of the vehicle and allow the vehicle to drive in a fail safe mode, if necessary.

According to the embodiment of the present disclosure, the system for determining the state of the power relay assembly can also determine the state of the power relay assembly not only in an ignition-on state, but also during the charging of the battery of the eco-friendly vehicle.

Accordingly, the system for determining the state of the power relay assembly according to the embodiment of the present disclosure may further include a charge controller 50 for determining whether charging power for charging the battery is provided or not.

When the eco-friendly vehicle is connected to an external charge facility, the charge controller 50 notifies connection with charge facility to the battery management system 30. Thereafter, when the battery management system 30 receives the abnormal signal, which notifies that the abnormality occurs in the electrical power system for driving the electric motor of the eco-friendly vehicle, from the upper controller such as the vehicle control unit (VCU) or the hybrid control unit (HCU) as described above, the battery management system 30 may confirm the state signal output from the voltage sensor 40 and determine the state of the power relay assembly 10.

In addition, when the battery is charged, since the voltage of the second input-output ports 120 and 121 is higher than the voltage of the first input-output ports 110 and 111 of the power relay assembly 10, a reverse voltage is applied between sources and drains of the semiconductor switching elements 13 and 14. Thus, the battery management system 30 can control the semiconductor switching elements 13 and 14 to always be in off-state to prevent application of the reverse voltage.

Figure 3:
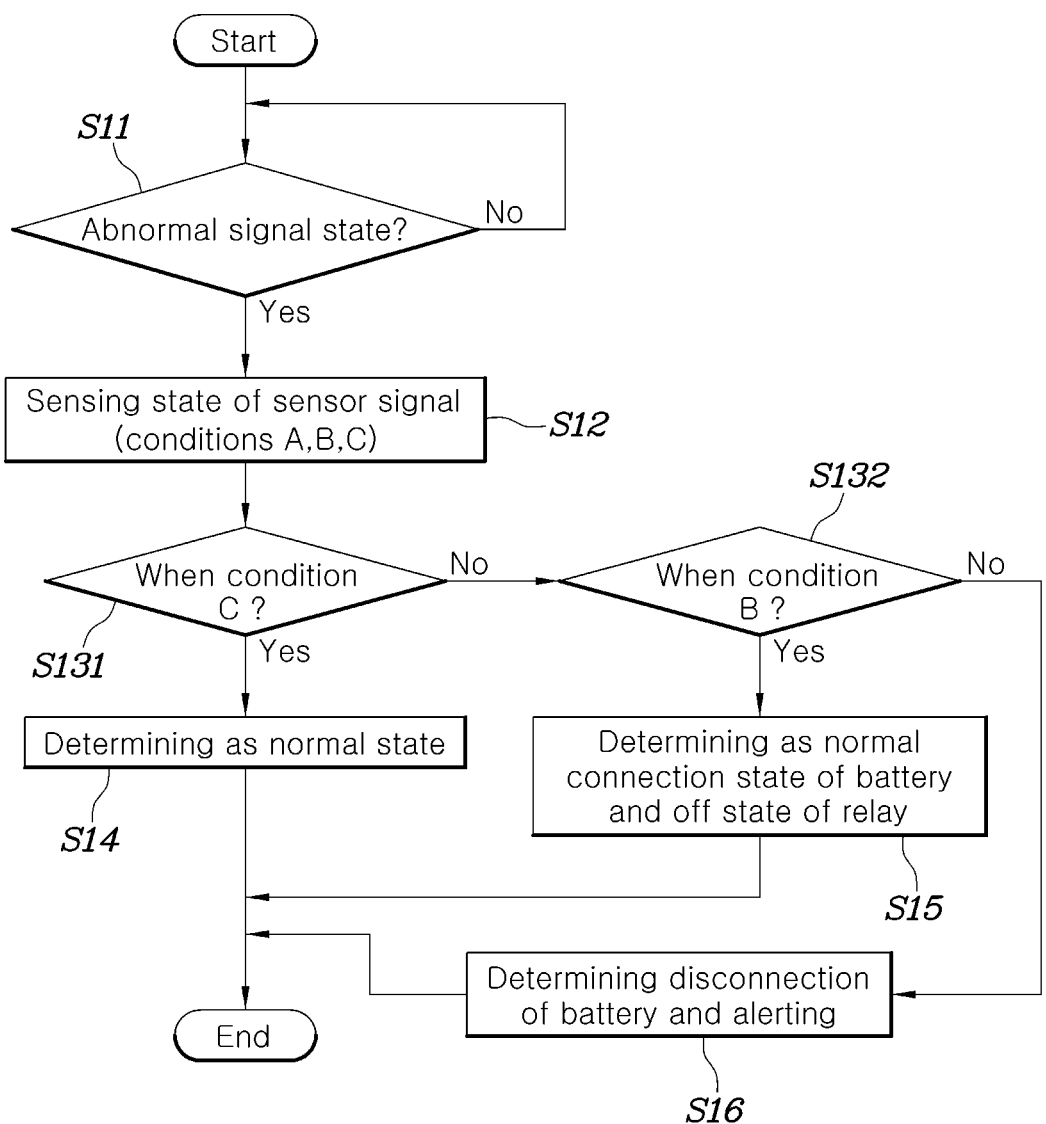
FIGS. 3 and 4 are flow diagrams showing various operation examples of the system for determining the state of the power relay assembly according to the embodiment of the present disclosure.
Figure 4:
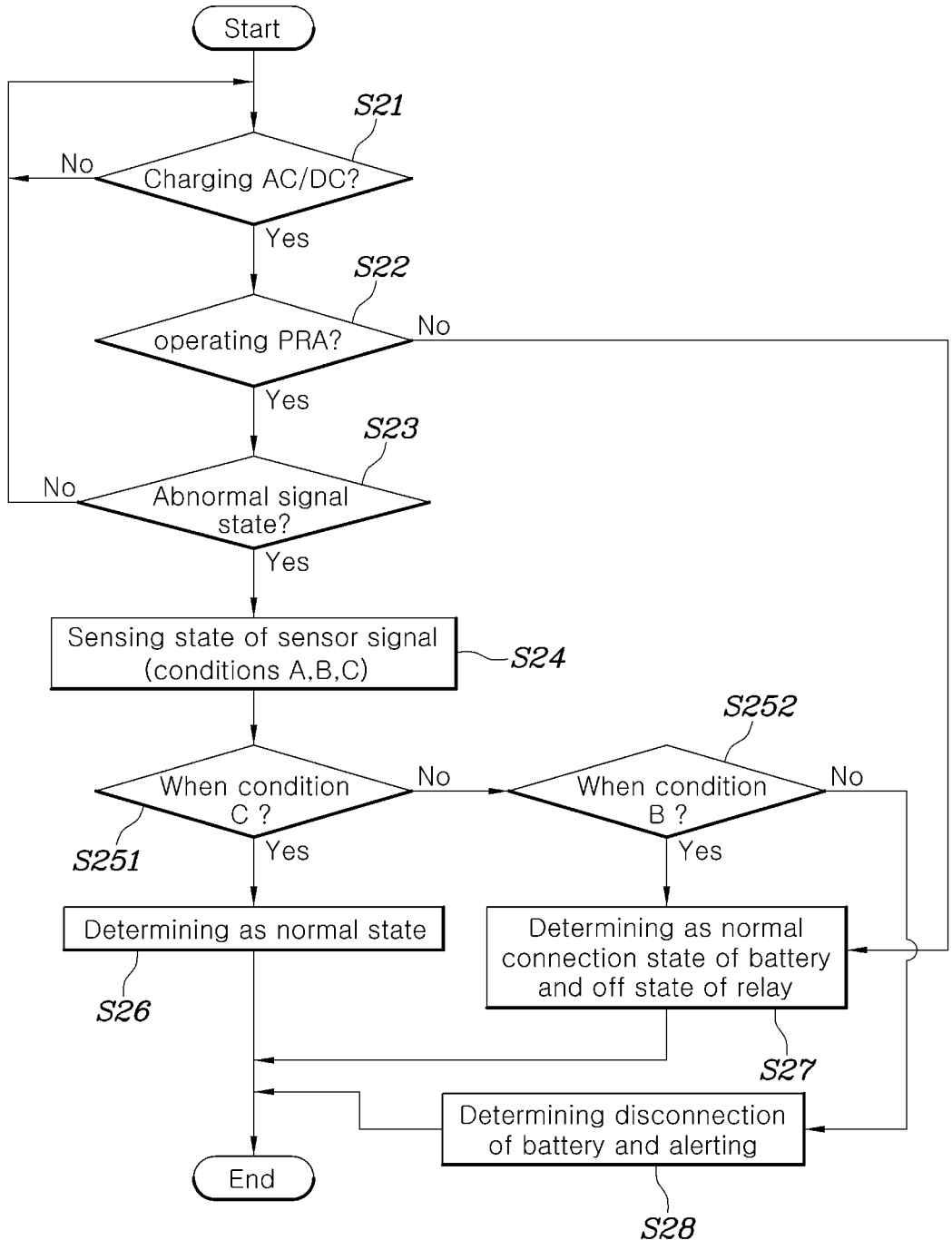

FIGS. 3 and 4 are flow diagrams showing various operation examples of the system for determining the state of the power relay assembly according to the embodiment of the present disclosure. In particular, FIG. 3 shows an operation example in a driving state of the vehicle after the vehicle is turned ignition-on, and FIG. 4 shows an operation example when the battery of the vehicle is charged.

First, referring to FIG. 3, when the battery management system 30 receives the abnormal signal, which notifies that the abnormality occurs in the electrical power system for driving the electric motor, from the upper controller such as the VCU or the HCU during driving the vehicle in the ignition-on state (S11), the power relay assembly according to the embodiment of the present disclosure receives the state signal output from the voltage sensor 40 (S12).

Here, the ignition-on state of the vehicle means a state at which the relays 11 and 12 of the power relay assembly 10 are turned in a short-circuited state by input of the driver and then power of the battery is applied to the electric motor for driving the vehicle. In the example in FIG. 1, the ignition-on state may mean a state, at which the relay controller 20 first turns on the semiconductor switching element for pre-charge 13 according to the direction of the battery management system 30, charges the capacitor of an input port of the inverter through the pre-charge resistor 15, and then turns on the main relays 11 and 12.

After the battery management system 30 receives the state signal output from the voltage sensor 40, the battery management system 30 may determine which of three conditions the state signal corresponds to, as shown in FIG. 2 (S131 and S132).

When the battery management system 30 receives the third output value corresponding to 'b' from the voltage sensor 40, the battery management system 30 may determine that the battery and the power relay assembly 10 are in a sort-circuited state and that the relays 11 and 12 of the power relay assembly 10 is in the on state, and determine as the ignition-on state (S14).

In addition, when the battery management system 30 receives the second output value corresponding to 'a' from the voltage sensor 40, the battery management system 30 may determine that the battery and the power relay assembly 10 are in a sort-circuited state, but the relays 11 and 12 of the power relay assembly 10 are in the off-state (S15). That is, in S15, the battery management system 30 may determine that the abnormality occurs in operation of the relays 11 and 12, not the normal ignition-on state. Accordingly, the battery management system 30 may perform a pre-set fail safe operation corresponding thereto, for example, re-driving after initialization of the relay controller 20 or stopping an electric vehicle mode in the case of a hybrid vehicle.

In addition, when the battery management system 30 receives the first output value corresponding to '0V' from the voltage sensor 40, the battery management system 30 may determine that the battery and the power relay assembly 10 are disconnected and that the vehicle is no longer driven in the electric vehicle mode, and may output a warning message or a warning sound to a cluster of the vehicle to cause the driver to terminate vehicle operation.

Next, referring to FIG. 4, when the charge controller 50 determines the charging power of alternating current AC or direct current DC from the external charge facility (S21), the battery management system 30 directs the relay controller 20 to operate the power relay assembly 10 so that the main relays 11 and 12 are turned on (S22). In S22, when the battery is charged, since the voltage of the second input-output ports 120 and 121 is higher than the voltage of the first input-output ports 110 and 111 of the power relay assembly 10, the reverse voltage is applied between the sources and the drains of the semiconductor switching elements 13 and 14. Thus, the battery management system 30 may direct the semiconductor switching elements 13 and 14 to always be in an off-state in order to prevent application of the reverse voltage.

Meanwhile, when the power relay assembly 10 is not operated in S22, the pre-set fail safe mode that is performed when relay operation is not normal, for example, the re-driving after the initialization of the relay controller 20 may be performed (S27).

When the battery management system 30 receives the abnormal signal, which notifies that the abnormality occurs in the electrical power system for charging the battery, from the upper controller such as the VCU or the HCU, while the relay operation is normally performed and charging is performed in S22 (S23), the battery management system 30 receives the state signal output from the voltage sensor 40 (S24).

After the battery management system 30 receives the state signal output form voltage sensor 40, the battery management system 30 may determine which of three conditions the state signal corresponds to, as shown in FIG. 2 (S251 and S252).

When the battery management system 30 receives the third output value corresponding to 'b' from the voltage sensor 40, the battery management system 30 may determine that the battery and the power relay assembly 10 are in the short-circuited state and that the relays 11 and 12 of the power relay assembly 10 is in the on state, and determine as a normal chargeable state (S26).

In addition, when the battery management system 30 receives the second output value corresponding to 'a' from the voltage sensor 40, the battery management system 30 may determines that the battery and the power relay assembly 10 are in short-circuited state, but the relays 11 and 12 of the power relay assembly 10 are in the off-state (S27). That is, in S27, the battery management system 30 may determine that the abnormality occurs in operation of the relays 11 and 12, and perform pre-set fail safe operation corresponding thereto, for example, the re-driving after the initialization of the relay controller 20.

In addition, the battery management system 30 receives the first output value corresponding to '0V' from the voltage sensor 40, the battery management system 30 may determine that the battery and the power relay assembly 10 are disconnected and that the battery is not charged any further, and may output a warning message or a warning sound to a cluster of the vehicle and direct the charge controller 50 or the upper controller to finish charging.

As described above, according to the various embodiment of the present disclosure, the system for determining the state of the power relay assembly can subdivided and distinguish a type of abnormality of the power relay assembly, so that it is possible to take quick action against trouble. In addition, by quickly taking the fail safe operation, the system for determining the state of the power relay assembly can prevent a larger problem from occurring by diagnosing relay abnormality in advance.

In addition, according to the various embodiment of the present disclosure, when a high voltage relay assembly, to which the semiconductor switching element is applied, is applied to the system for determining the state of the power relay assembly, the system for determining the state of the power relay assembly can prevent the semiconductor switching element from being damaged by a momentary reverse voltage when the eco-friendly vehicle is charged.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A system for determining a state of a power relay assembly, the system comprising:
   a power relay assembly including at least one relay configured to electrically connect or disconnect a first input-output port connected to a side of a battery of a vehicle to a second input-output port;
   a relay controller outputting a control signal controlling electrical connection states of the relay to the relay;
   a battery management system configured to determine connection state of the relay and directing a connection state adjustment of the relay; and
   a voltage sensor configured to sense a voltage of the first input-output port and outputting a state signal indicating a state of the power relay assembly, based on the sensing voltage of the first input-output port and the control signal output from the relay controller.

2. The system for determining the state of the power relay assembly of claim 1, wherein when an abnormal signal is input from an upper controller, the battery management system reads an electrical connection state between the battery and the power relay assembly and an operation state of the relay, based on the state signal output by the voltage sensor, and determines whether the signal is abnormal or not.

3. The system for determining the state of the power relay assembly of claim 2,
   wherein when a voltage smaller than a pre-set size is sensed, the voltage sensor outputs a first output value as the state signal,
   when a voltage larger than the pre-set size is sensed and when the control signal is a signal for opening the relay, the voltage sensor outputs a second output value as the state signal, and
   when a voltage larger than the pre-set size is sensed and when the control signal is a signal for closing the relay, the voltage sensor outputs a third output value as the state signal.

4. The system for determining the state of the power relay assembly of claim 3, wherein when the voltage sensor outputs the first output value, the battery management system determines that the battery and the power relay assembly are disconnected.

5. The system for determining the state of the power relay assembly of claim 3, wherein when the voltage sensor outputs the second output value during driving the vehicle, the battery management system determines that the battery and the power relay assembly are in a short-circuited state and the relay is opened.

6. The system for determining the state of the power relay assembly of claim 3, wherein when the voltage sensor outputs the third output value during driving the vehicle, the battery management system determines that the battery and the power relay assembly are in the short-circuited state and the relay is operated normally.

7. The system for determining the state of the power relay assembly of claim 3, further comprising:
   a charge controller for determining whether charging power for charging the battery is provided from a charge facility outside the vehicle or not,
   wherein the power relay assembly further includes a semiconductor switching element for arc suppression, which is connected to the relay in parallel.

8. The system for determining the state of the power relay assembly of claim 7, wherein when the charge controller determines that the charging power is provided, the battery management system directs the semiconductor switching element to turn off.

9. The system for determining the state of the power relay assembly of claim 7, wherein when the charge controller determines that the charging power is provided and when the voltage sensor outputs the second output value, the battery management system determines that the battery and the power relay assembly are in the short-circuited state and the relay is opened.

10. The system for determining the state of the power relay assembly of claim 7, wherein when the charge controller determines that the charging power is provided and when the voltage sensor outputs the third output value, the battery management system determines that the battery and the power relay assembly are in short-circuited state and the relay is operated normally.

* * * * *